United States Patent [19]

Franz

[11] Patent Number: 4,577,416
[45] Date of Patent: Mar. 25, 1986

[54] TRACING SENSOR

[75] Inventor: Wiesner Franz, Owen, Fed. Rep. of Germany

[73] Assignee: Traub GmbH, Reichenbach, Fed. Rep. of Germany

[21] Appl. No.: 629,728

[22] PCT Filed: Nov. 4, 1983

[86] PCT No.: PCT/EP83/00290
§ 371 Date: Jul. 5, 1984
§ 102(e) Date: Jul. 5, 1984

[87] PCT Pub. No.: WO84/01820
PCT Pub. Date: May 10, 1984

[30] Foreign Application Priority Data

Nov. 5, 1982 [DE] Fed. Rep. of Germany ... 8231029[U]

[51] Int. Cl.⁴ .............................................. G01B 7/28
[52] U.S. Cl. .................................... 33/561; 33/169 R
[58] Field of Search ............ 33/169 R, 172 E, 174 L, 33/174 PC, 568, 561

[56] References Cited

U.S. PATENT DOCUMENTS

| 4,203,225 | 5/1980 | Nilsson | 33/174 L |
| 4,270,275 | 6/1981 | McMurtry | 33/174 L |
| 4,279,080 | 7/1981 | Nakaya | 33/174 L |
| 4,443,946 | 4/1984 | McMurtry | 33/174 L |

FOREIGN PATENT DOCUMENTS 2070249 9/1981 United Kingdom ............. 33/174 L

Primary Examiner—Richard R. Stearns
Attorney, Agent, or Firm—Sheridan Neimark; Karl W. Flocks; A. Fred Starobin

[57] ABSTRACT

A sensor pin carrier (34) is disposed in a housing (20) and rests on a support member (26) by way of a bearing which is arranged all around a central longitudinal axis (40), and the sensor pin carrier is designed for securing at least one sensor pin (38). The sensor pin carrier (34) is attached in the middle of an elastic disc (30) disposed vertically with respect to the longitudinal axis (40) and secured at its outer edge in the housing (20). At least one electric switch (56) is associated with the sensor pin carrier (34) to generate a signal upon deflections of the sensor pin (38).

7 Claims, 1 Drawing Figure

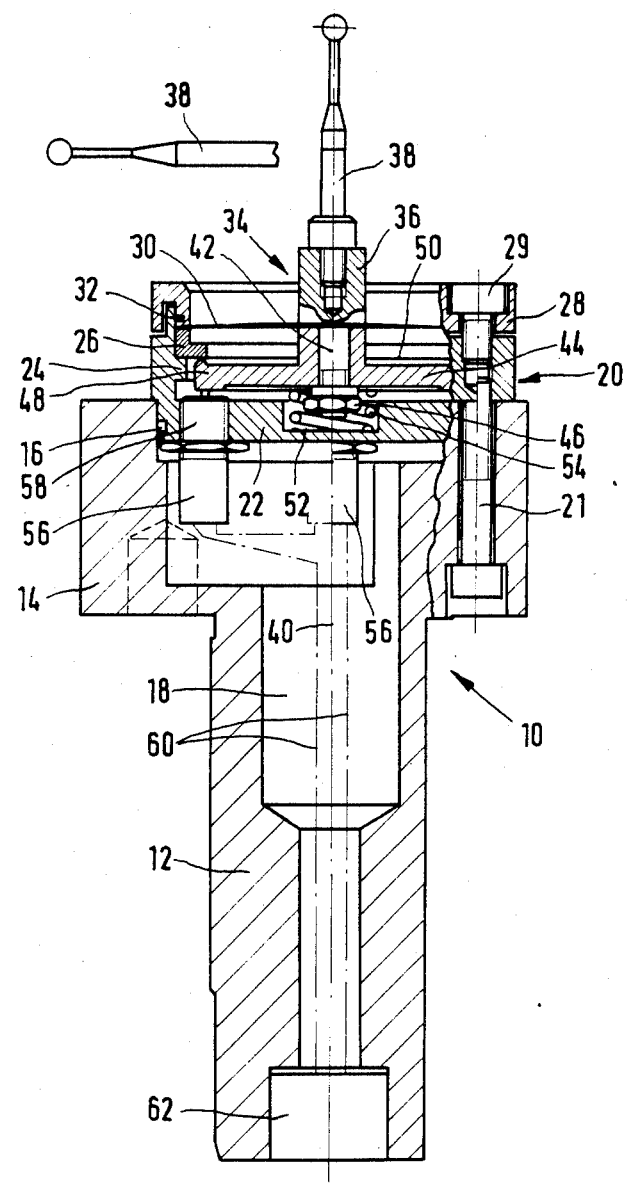

TRACING SENSOR

The invention relates to a tracing sensor, comprising a housing at which a support member is arranged, a sensor pin carrier resting on the support member by way of a bearing which is disposed all around a central longitudinal axis and designed for securing at least one sensor pin, and a spring means tending to hold the sensor pin carrier in an inoperative position in which it rests on the support member by way of the entire bearing yet permitting the sensor pin carrier to tilt, under the influence of an external force acting on the sensor pin, about a transverse axis extending transversely of said force and of the longitudinal axis and also permitting the emission of a signal caused by such tilting.

The sensor pin carrier of a known tracing sensor of this kind (journal "Industrie-Anzeiger", no. 27 of Apr. 2, 1982/104th year, page 20) has three radial arms which are offset with respect to one another by angular distances of 120° each within the housing in a plane normal to the central longitudinal axis. At their ends they each comprise a contact piece. In the inoperative position these contact pieces abut against the support member and together form a bearing for the sensor pin carrier, on the one hand, while they are connected, on the other hand, to a circuit each adapted to be closed by the support member. The spring means consists of a central helical compression spring which is held between an axial spike provided at the inner end of the sensor pin carrier, with respect to the housing, and an opposed front end wall of the housing.

Good measuring accuracy cannot be maintained with this known tracing sensor over longer periods of use because the contact pieces cannot be of such character, either in configuration or choice of material, as to correspond in optimum fashion to the demands to be met on the one hand as component parts of the bearing and, on the other hand, as electric switching elements. If the contact pieces are designed as dot-shaped seats or sharp edged blades of hard material, as would be desirable for a high-quality bearing, contact is not established reliably and more or less burnoff loss occurs in operation, depending on the level of the electrical voltage applied. Hereby, again the bearing properties become poorer. On the other hand, if the contact pieces are made of precious metal in consideration of their electrical properties, they become softer than component parts of a dot or blade support are allowed to be at strict accuracy requirements.

These problems become even more acute when the known tracing sensor in operation is exposed to forces acting on the sensor pin in the direction of the longitudinal axis and causing the sensor pin carrier to be lifted with its three stellate arms simultaneously from the support body. In this raised condition the sensor pin carrier remains to be supported only by the axial helical spring which exerts a force of reaction that is not exactly axial on the sensor pin carrier even if the deviations from a configuration and arrangement coaxial with the longitudinal axis are only minute, as cannot be avoided in practice. Under predetermined load, therefore, the sensor pin carrier will adopt a position that cannot be predetermined accurately and in which one or the other of its contact pieces will establish a more or less uncertain electrical connection with the support member, at any rate, an electrical connection which is not reproducible with sufficient accuracy. In this manner measuring results may be pretended which not only are inaccurate but even lack any detectable relationship with reality.

It is, therefore, the object of the invention to develop a tracing sensor such that it will provide accurate and reproducible measuring results during a long lifetime.

This object is met, in accordance with the invention, with a tracing sensor of the kind recited initially in that the spring means comprises an elastic disc which is disposed substantially vertically with respect to the longitudinal axis and in the center of which the sensor pin carrier is fixed and the outer edge of which is fixed to the housing, and in that at least one electric switch for signaling and separated from the bearing is associated with the sensor pin carrier.

In this manner sufficient guidance of the sensor pin carrier by the elastic disc is obtained at all times even if it should no longer be supported on the support member by way of the bearing because the sensor pin is under axial load. The at least one electric switch has no bearing function to fulfill and, therefore, may be designed exclusively in consideration of its electrical properties. Such switches, for instance including precious metal contacts in an inert gas atmosphere are commercially available in embodiments which guarantee exactly reproducible switching during a long lifetime. The bearing of the sensor pin carrier may be made of a material which is especially well suited for knife edge bearings, such as heat-treated steel because it is entirely free of electrical stresses. And this is not to the disadvantage of the electrical contact making.

The tracing sensor according to the invention is suited especially to detect workpiece or tool dimensions in machine tools having the traverses or cycles of work controlled by a computer (numerical control or computer numerical control). In sensing the workpiece or tool surface, after a small deflection of the sensor pin, the tracing sensor interrupts a circuit, thus emitting a switching signal which is evaluated by the control computer. This permits calculation, for instance, of a workpiece or tool position by means of path measuring systems of the corresponding machine tool or testing machine.

In a preferred embodiment of the invention the elastic disc is loaded in the direction of the longitudinal axis by an additional spring so that the disc is arched outwardly when at rest. This has the advantage that the distance is increased by which the sensor pin carrier can yield under axial loading of the sensor pin without any risk of damaging the elastic disc.

Preferably, the elastic disc is of circular ring shape. This has the advantage that under deflection conceivable of the sensor pin out of its inoperative position, uneven stressing of the elastic disc is avoided to the greatest extent possible, and the elastic return forces of the disc are of the same magnitude under loads of the same magnitude acting in different directions.

The invention is developed further in advantageous manner in that the sensor pin carrier comprises an outer member carrying the sensor pin and an inner member cooperating with the support member, and in that the outer and inner members are braced through the elastic disc. This type of fastening of the sensor pin carrier at the elastic disc is especially simple and reliable.

Furthermore, it is convenient to have the elastic disc clamped at its outer edge between the support member and a flange fixed to the housing. In this manner the elastic disc behaves like a membrane.

It is especially advantageous if the elastic disc provides a tight seal toward the outside of a space in the housing containing the support member, the bearing, and movable parts of the or each switch. In this manner contaminations of the parts mentioned are excluded, and this is a substantial contribution to maintaining the operational safety and measuring accuracy of the tracing sensor according to the invention over a long period of time.

The support member may be a ring inserted into the housing. Thus it may be made of hardened steel, while the housing consists of a softer material. Also, the support member may be exchanged when it begins to show traces of wear.

It is further advantageous if the sensor pin carrier has a circular edge at which the bearing is formed, and if the support member is flat at its side remote from the elastic disc, at which side the bearing is supported.

The bearing may be a continuous circular ring or it may consist of a plurality of bearing dots disposed at regular angular spacings around the central longitudinal axis or of individual blades or knife edges.

Moreover, the invention preferably is modified in that the bearing is disposed between the elastic disc and a bottom of the housing, and in that the at least one switch is secured to the bottom.

In that context it is convenient if the at least one switch is adjustable by fine threads in the direction of the longitudinal axis.

An embodiment of the invention will be described in greater detail below, with reference to a diagrammatic drawing. The drawing shows a tracing sensor according to the invention in an axial longitudinal section.

The tracing sensor shown includes a substantially tubular holder 10 having a shaft 12 by which it may be clamped, for instance, in a carriage of a processing or measuring machine, and further having a head 14 formed with a cylindrical recess 16 and a stepped bore 18 extending from the recess through the entire shaft 12.

A pot-shaped housing 20 is inserted into the recess 16 and fastened by screws 21 to the head 14. It has a bottom 22 and, spaced above the same, an annular inner shoulder 24 on which rests an annular support member 26 of hardened steel introduced into the housing 20. Above the support member a flange 28 is fastened to the housing 20 by screws 29.

A membrane-like, annular, elastic disc 30 is clamped by its outer edge between the support member 26 and the flange 28. The outer edge is embedded in sealing material 32, and the elastic disc 30 is tight on the whole so that it provides a tight seal of the interior space of the housing 20 located below the disc. In the embodiment shown the elastic disc 30 is made of spring steel sheet material of a thickness of 0.1 mm.

A sensor pin carrier 34 is fixed in the middle to the elastic disc 30. The sensor pin carrier 34 comprises a cylindrical outer member 36 to which a sensor pin 38 is secured. In the embodiment shown the axis of the sensor pin 38 coincides with the axis of the overall sensor pin carrier 34, hereinafter referred to as the central longitudinal axis 40. In addition, or as an alternative, at least one sensor pin 38 whose axis has a different direction may be fixed to the sensor pin carrier 34. This axis, for example, may include a right angle with the central longitudinal axis 40.

The outer member 36 of the sensor pin carrier 34 includes a threaded pin 42 which extends axially through a central aperture in the disc 30 and carries a substantially disclike inner member 44 likewise belonging to the sensor pin carrier 34 and being fastened by a nut 46 such that the central portion of the elastic disc 30 is clamped tightly and firmly between the outer and inner members 36 and 44.

The disc-like inner member 44 has an outer edge 48 of circular ring shape at which a bearing 50 is formed. This bearing may be embodied by a blade or knife edge of circular ring shape, or it may consist of a plurality, for example six, conical bearing spots or prism-shaped bearing blades uniformly spaced around the central longitudinal axis 40. In any case, at the position of rest of the sensor pin carrier 34 shown in the drawing, the bearing 50 abuts under defined bias against a flat annular surface at the underside of the support member 26.

A central bore 52 is formed in the bottom 22 of the housing 20 to receive the one end of an additional spring 54.

This spring 54, constituted by a cylindrical helical spring in the embodiment shown, exerts a predetermined axial force from below on the inner member 44 and, in the embodiment shown, it is alone responsible of having the bearing 50 abut against the support member 26 when the sensor pin carrier 34 is in its inoperative position. The elastic disc alone would have the effect that the bearing 50 would be spaced by, for instance 0.6 mm from the planar underside of the support member 26. However, the additional spring 54 is so strong that it causes the elastic disc 30 to become arched upwardly by the extent mentioned of, for example, 0.6 mm. When the sensor pin carrier 34 is in its inoperative position, therefore, the elastic disc 30 adopts the configuration indicated in the drawing of a flat frustum.

The sensor pin 38 and, together with it, the sensor pin carrier 34 may be deflected in any direction normal to the longitudinal axis 40 against the resistance offered by the elastic disc 30 and the additional spring 54. Furthermore, the sensor pin 38 together with the sensor pin carrier 34 may be displaced in the direction of the longitudinal axis toward the interior space of the housing 20, against the resistance offered by the spring 54. In an initial stage, as long as the disc 30 is arched outwardly, this displacement is enhanced by the disc. Yet when the axial displacement becomes so great that the disc 30 becomes curved inwardly, i.e. in downward direction with the arrangement shown, the disc also produces an axial counteracting force.

Two electric switches 56 are disposed at the bottom 22 of the housing 20 and diametrically opposite each other with respect to the longitudinal axis 40. For the sake of clarity one of the switches 56 is presented in the drawing in a position which is offset by 90° as compared to its actual position. Preferably four switches 56 offset respectively by 90° are arranged at the bottom 22 if deflections are to be detected of the sensor pin 38 in several directions normal to the longitudinal axis 40.

Each one of the switches 56 has a fine thread 58 by which it is screwed adjustably into the bottom 22. Leads 60 pass from the switches 56 into a connector chamber 62 formed at the end of the shaft 12. There a plug, an induction coil, or the like may be provided for connection of the switches 56 with lines extending to the corresponding processing or testing machine.

If the bearing 50 is made of individual bearing spots or blades or knife edges, each of the switches 56 preferably is arranged exactly diametrically opposite one of the same.

What is claimed is:

1. A tracing sensor comprising
   a pot-shaped housing (20) having a closed bottom (22) and an inner shoulder (24);
   an annular insert support member (26) abutting against said shoulder (24);
   a disc-like member (44) arranged between said bottom (22) and said support member (26);
   an annular flange (28) fastened to said housing (20);
   a membrane-like, annular elastic disc (30) clamped at its radially outer edge between said support member (26) and said annular flange (28);
   a sensor pin (38) secured to a pin carrier having an axially outer carrier member (36) and said disc-like member (44) as parts thereof;
   said membrane-like, annular elastic disc (30) clamped at its radially inner edge between said disc-like member (44) and said axially outer carrier member (36);
   a spring (54) arranged between said bottom (22) and said disc-like member (44);
   a plurality of switches (56) cooperating with said disc-like member (44).

2. The tracing sensor as claimed in claim 1 further characterized by
   said elastic disc (30) forming a tight seal at its radially outer edge.

3. The tracing sensor as claimed in claim 1 further characterized by
   said sensor pin carrier (34) having a circular edge (48) at which a bearing (50) is formed;
   said support member (26) being flat on its side remote from said elastic disc (30) on which side said bearing (50) contacts.

4. The tracing sensor as claimed in claim 1 further characterized by
   at least one of said switches (56) being secured to said bottom (22).

5. The tracing sensor as claimed in claim 1 further characterized by
   at least one of said switches (56) being adjustable by fine threads (58) along the direction of the longitudinal axis of the tracing sensor.

6. The tracing sensor as claimed in claim 1 further characterized by
   said elastic disc (30) being of circular ring shape.

7. The tracing sensor as claimed in claim 1 further characterized by
   said outer carrier member (36) and said disc-like member (44) of said sensor pin carrier (34) being braced through said elastic disc (30).

* * * * *

UNITED STATES PATENT AND TRADEMARK OFFICE
CERTIFICATE OF CORRECTION

PATENT NO. : 4,577,416
DATED : March 25, 1986
INVENTOR(S) : Franz Wiesner

It is certified that error appears in the above-identified patent and that said Letters Patent is hereby corrected as shown below:

On the cover page, line [75], change the name of the inventor from "Wiesner Franz" to --Franz Wiesner--.

Signed and Sealed this

Third Day of June 1986

[SEAL]

Attest:

DONALD J. QUIGG

*Attesting Officer*     *Commissioner of Patents and Trademarks*